April 29, 1969   W. M. RHYME   3,440,810
SAND TRAP RAKE
Filed Feb. 21, 1966
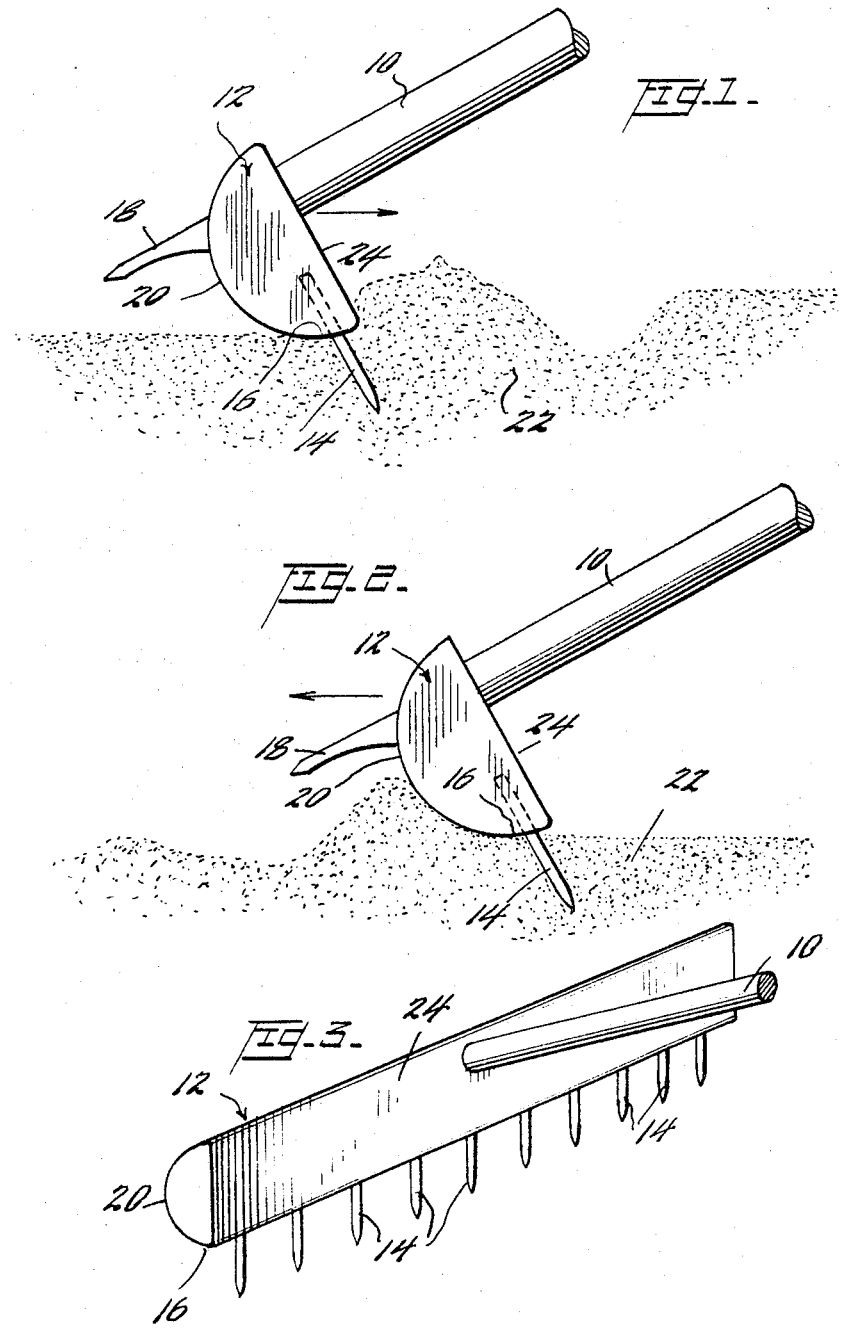
INVENTOR.
William M. Rhyme
BY Misegades + Douglas
Leith Misegades
ATTORNEYS

United States Patent Office 3,440,810
Patented Apr. 29, 1969

3,440,810
SAND TRAP RAKE
William M. Rhyme, Rhyme Bldg., Portage, Wis. 53901
Filed Feb. 21, 1966, Ser. No. 529,071
Int. Cl. A01d 7/02, 7/10
U.S. Cl. 56—400.01                                6 Claims

ABSTRACT OF THE DISCLOSURE

The invention disclosed comprises a floating sand trap rake including a head with a plurality of tines depending therefrom and an arcuate, ground engaging surface extending forwardly of the tines providing a supportive surface so as to prevent the rake from digging into the sand when used. The head may also include a spike for standing the rake in an upright position when not in use.

---

This invention refers to rakes in general and, more particularly, to an improved rake for granular material or the like.

The invention has particular utility as a sand trap rake for golf courses. While it is not intended in the game of golf that the ball be played out of a sand trap, in the ordinary course of play, the location is appropriately denominated a trap. The trap frequently has an uneven surface, due to the unstable nature of the sand and its lack of binding medium. The player is supposed to smooth the sand after play if he has access to a rake and some courses provide them in more-or-less accessible spots. But the conventional lawn or garden rakes are not well adapted to the raking of sand nor do they adapt themselves to standing without leaning against a wall or being suspended from a special fixture.

The present invention overcomes the above disadvantages by providing a rake, especially designed for use in granular material, having a floating blade, generally elliptical in cross-section so that the rake will not dig into the surface of the granular material or sand, the blade having a plurality of prongs along the bottom edge thereof for raking the sand and leaving the desired corrugations in the surface of the sand, a handle on the blade for manipulating the rake, and a spike on the blade on a side opposite the handle for setting the rake in an upright position when not in use.

The invention is particularly adapted for use by the golfer; thus, each sand trap of the golf course would be provided with its own implement. Of course, the tool could be added to the equipment normally used by the greenskeeper in taking care of the course. In the preferred embodiment of the invention, the rounded blade is provided with a flat side facing the operator of the tool for digging into the sand when necessary. The design of the tool permits it to be constructed of lightweight materials so that it may be easily manipulated with one hand; there is no need for the golfer to lay down his golf club while using the tool. Finally, the design of the invention permits its use right up to the edge of the sand trap where the depth of the sand is relatively shallow as the tool is adapted to disturb only the surface of the sand.

These and further objects and advantages of the invention will become readily apparent by reference to the following specification and drawings in which:

FIGURE 1 is an elevational side view of the invention in use, showing employment of the flat side of the blade in a pulling maneuver;

FIGURE 2 is view similar to FIG. 1 showing use of the invention in a pushing maneuver; and FIGURE 3 is a perspective view of the invention, drawn to a reduced scale.

Referring now to the drawings by reference character, the invention is shown comprising a handle 10, of convenient length to be grasped by an operator of the invention, a blade element 12, generally elliptical in cross-section, a plurality of tines 14, mounted along the bottom edge 16 of blade 12, and a spike element 18, attached centrally of blade 12, on a side 20 opposite handle 10. As can be seen in FIGS. 1 and 2, the long axis of the elliptical shape of blade 12 is disposed generally at 90° to the axis of handle 10. The curved, forward side 20 of blade 12 permits a broader area of blade 12 to contact sand 22 in a pushing operation (FIG. 2) while flattened side 24 of blade 12 allows only a relatively narrow portion of bottom edge 16 to rest on sand 22 in a pulling operation (FIG. 1). Tines 14 are attached parallel each to the other and to the plane of flattened side 24 so that a generally flat planar area extending from the tips of tines 14 to the top of side 24 is provided for moving sand 22. Thus, the invention may be pushed to effect only a slight disturbance of the surface of sand 22, but pulled to smooth out deeper depressions in the surface of the sand. Tines 14 will leave the desired corrugated appearance in the surface of the sand as the invention is used.

Spike 18 is provided so that the invention may be inserted into the ground adjacent the sand trap when not in use. The upright position of the invention serves to protect tines 14 from damage as well as prevent possible injury to a passerby who might clumsily step on the invention. Were the invention to be laid on the ground, possible injuries to one stepping on the tool, as well as to the tool itself, might result.

It can be seen from the foregoing that I have invented a new and highly useful device in the art of rakes for granular material.

I claim:

1. A rake for granular material or the like comprising a handle, a blade and a plurality of tines depending therefrom, said blade on the side opposite the handle being generally bowed outwardly and including along the lower face thereof an arcuate ground engaging surface extending laterally forwardly of the tines so as to provide a supportive surface for the rake thereby preventing the rake from digging into the granular material during use.

2. The device of claim 1 wherein the long axis of said bowed portion is disposed approximately 90° to said handle.

3. The device of claim 1 wherein said blade is flattened on a side facing said handle.

4. The device of claim 3 wherein said tines are arranged generally parallel each to the other, and to the flattened side.

5. The device of claim 3 wherein each of said tines has a length less than the width of said flattened side.

6. The device of claim 1 wherein said blade is provided with a spike on the side opposite that of said handle, said spike being of sufficient length to hold said rake in an upright position when said spike is inserted into the ground.

References Cited

UNITED STATES PATENTS

| | | | |
|---|---|---|---|
| 244,991 | 8/1881 | Fox | 56—400.21 X |
| 1,207,308 | 12/1916 | McCoy | 56—400.05 |
| 1,493,292 | 5/1924 | Sweeney | 56—400.05 X |
| 2,010,325 | 8/1935 | Sawyer | 56—400.05 |
| 2,314,620 | 3/1943 | Jander | 56—400.01 |
| 2,317,916 | 4/1943 | Kallal | 56—400.01 |

ALDRICH F. MEDBERY, Primary Examiner.

U.S. Cl. X.R.

56—400.06